United States Patent [19]

Takeuchi et al.

[11] 4,340,685

[45] Jul. 20, 1982

[54] PROCESS FOR PREPARING POLYBUTADIENE HAVING A 1,2-CONFIGURATION CONTENT OF 5-40% AND A CIS-1,4-CONFIGURATION CONTENT OF 60% OR MORE

[75] Inventors: Yasumasa Takeuchi; Yutaka Obata, both of Yokkaichi; Noboru Ohshima, Suzuka; Tooru Shibata; Kaoru Nakako, both of Yokkaichi, all of Japan

[73] Assignee: Japan Synthetic Rubber Co., Ltd., Tokyo, Japan

[21] Appl. No.: 228,625

[22] Filed: Jan. 26, 1981

[30] Foreign Application Priority Data

Jan. 31, 1980 [JP] Japan .................................. 55/10757

[51] Int. Cl.³ ............................ C08F 2/06; C08F 4/70
[52] U.S. Cl. ................................. 525/247; 525/315; 526/79; 526/335
[58] Field of Search ................ 525/247, 242; 526/140, 526/79

[56] References Cited

PUBLICATIONS

English Abstract of Japanese Pat. Publication 17, 667/74.

*Primary Examiner*—Stanford M. Levin
*Attorney, Agent, or Firm*—Oblon, Fisher, Spivak, McClelland & Maier

[57] ABSTRACT

A process for preparing polybutadiene having a 1,2-configuration content of 5-40% and a cis-1,4-configuration content of 60% or more, which comprises polymerizing 1,3-butadiene in the presence of a catalyst consisting of:

(A) a cobalt compound,
(B) at least one member selected from the group consisting of:
 (i) a trialkylaluminum,
 (ii) a reaction product of a trialkylaluminum and an alcohol or water,
 (iii) a mixture of a trialkylaluminum and a dialkylaluminum halide,
 (iv) a dialkylaluminum hydride, and
 (v) an organolithium compound, and
(C) at least one compound selected from the group consisting of phenyl isothiocyanate and carbon disulfide, in a hydrocarbon or halogenated hydrocarbon solution of a high cis-1,4-polybutadiene obtained by polymerizing 1,3-butadiene with a catalyst consisting of:
(D) at least one compound selected from the group consisting of the organocarboxylates of nickel and organic complex compounds of nickel,
(E) at least one compound selected from the group consisting of boron trifluoride, boron trifluoride complex compounds and hydrogen fluoride, and
(F) at least one compound selected from the group consisting of the organometallic compounds of the alkali metals of the Group II or III metals of the Periodic Table. The polybutadiene produced by this process has an improved tear strength and improved flexural fatigue properties.

18 Claims, No Drawings

PROCESS FOR PREPARING POLYBUTADIENE HAVING A 1,2-CONFIGURATION CONTENT OF 5-40% AND A CIS-1,4-CONFIGURATION CONTENT OF 60% OR MORE

This invention relates to a process for preparing polybutadiene with an improved tear strength and improved flexural fatigue properties by polymerizing 1,3-butadiene in the presence of a 1,2-syndiotactic polymerization catalyst of the cobalt type in a solution of a high cis-1,4-polybutadiene prepared with a nickel type catalyst.

Rubber products obtained from high cis-1,4-polybutadienes have been widely used in tire and other rubber goods by virtue of their excellent properties such as high impact resilience, low heat build-up and high wear resistance which are not possessed by natural rubber.

However, the amount of such high cis-1,4-polybutadienes commercially used has been limited because they are poor in tear strength and flexural fatigue properties as compared with natural rubber and also because when they are compounded with a high-hardness recipe in which a large amount of carbon black is blended the viscosity of the compound becomes high and the processability of the compound becomes inferior. Therefore, it has strongly been desired to overcome the above-mentioned disadvantages in the fields of tire production and other disadvantages in the fields of tire production and other industrial rubber products.

As a method for producing a high cis-1,4-polybutadiene with an improved tear strength and improved flexural fatigue properties, a method has been proposed in which a high cis-1,4-polybutadiene produced by using a cobalt type catalyst is subjected to 1,2-polymerization before the termination of the polymerization reaction (Japanese Patent Publication Nos. 17666/74 and 17667/74). However, even by this method, the flexural fatigue properties and tear strength have not been improved to a satisfactory extent.

The object of this invention is, therefore, to provide a process for preparing a polybutadiene which is appreciably improved in flexural fatigue properties, tear strength and processability as compared with conventional polybutadienes at substantially the same levels of modulus and hardness.

According to this invention, there is provided a process for preparing a polybutadiene having an improved tear strength and improved flexural fatigue properties and having a 1,2-configuration content of 5-40% and a cis-1,4-configuration content of 60% or more, which comprises polymerizing 1,3-butadiene by using a catalyst consisting of:

(A) a cobalt compound,
(B) at least one member selected from the group consisting of:
   (i) a trialkylaluminum,
   (ii) a reaction product of a trialkylaluminum and an alcohol or water,
   (iii) a mixture of a trialkylaluminum and a dialkylaluminum halide,
   (iv) a dialkylaluminum hydride, and
   (v) an organolithium compound, and
(C) at least one compound selected from the group consisting of phenyl isothiocyanate and carbon disulfide, in a hydrocarbon or halogenated hydrocarbon solution of a high cis-1,4-polybutadiene obtained by polymerizing 1,3-butadiene with a catalyst consisting of:

(D) at least one compound selected from the group consisting of organocarboxylates of nickel and organic complex compounds of nickel,
(E) at least one compound selected from the group consisting of boron trifluoride, boron trifluoride complex compounds and hydrogen fluoride, and
(F) at least one compound selected from the group consisting of organometallic compounds of the alkali metals and the Group II or III metals of the Periodic Table.

As the catalyst component (D) for obtaining the high cis-1,4-polybutadiene according to this invention, there may be used organocarboxylates of nickel, organic complex compounds of nickel or mixtures thereof. As said organocarboxylates of nickel, there may be used nickel formate, nickel acetate, nickel octanoate, nickel naphthenate, nickel stearate, nickel benzoate and nickel salicylate. As the organic complex compounds of nickel, there may be used bis(ethylacetoacetate)nickel, bis(acetylacetonato)nickel, bis($\alpha$-furyldioxime)nickel, and bis(salicylaldehyde)ethylenediminenickel.

As the catalyst component (E), there are used boron trifluoride, boron trifluoride complex compounds, hydrogen fluoride and mixtures of two or more of them. As the boron trifluoride complex compounds, there may be used, for example, boron trifluoride-diethyl etherate, boron trifluoride-dibutyl etherate, boron trifluoride-dioctyl etherate, boron trifluoridephenolate, and the like.

The organometallic compounds of the alkali metals and the Group II or III metals of the Periodic Table are used as the catalyst component (F). Examples of said organometallic compounds are butyllithium, butylsodium, amylsodium, diethylzinc, diethylcadmium, triethylaluminum, triisobutylaluminum, trimethylaluminum, trihexylaluminum and diethylaluminum fluoride.

The amount of the high cis-1,4-polymerization catalyst used in the process of this invention is usually that corresponding to 0.02-2.5 mg atom nickel of the component (D) per 100 g of 1,3-butadiene. The molar ratios of the respective catalyst components are as follows:

Component $(D)$/component $(F)$ (molar ratio) = 0.02/1 to 2/1

Component $(E)$/component $(F)$ (molar ratio) = 0.2/1 to 15/1

A variety of methods are available for the preparation of said catalyst in the process of this invention, but it is preferable to prepare the catalyst by adding the three components (D), (E) and (F) in the presence of 1,3-bitadiene as this method provides a catalyst with a high polymerization activity.

The solvent for the high cis-1,4-polymerization may be suitably selected from aromatic hydrocarbon solvents such as benzene, toluene, xylene, etc.; aliphatic hydrocarbon solvents such as butene, pentane, hexane, heptane, octane, etc.; alicyclic hydrocarbon solvents such as methylcyclopentane, cyclohexane, etc.; and the mixtures thereof, though it is preferred to use an aromatic hydrocarbon solvent or a solvent containing the same. The polymerization temperature for the high cis-1,4-polymerization is within the range of from $-20°$ to $150°$ C., preferably from $0°$ to $100°$ C.

The cis-1,4-configuration content in the high cis-1,4-polybutadiene of this invention is at least 90%, preferably at least 94%, and the 1,2-configuration content is not more than 3%. The molecular weight of the high cis-1,4-polybutadiene of this invention corresponds to an intrinsic viscosity $[\eta]_{toluene}^{30°\ C.}$ of 1.2 to 10 dl/g, preferably 1.5 to 5 dl/g.

As the high cis-1,4-polybutadiene solution for the 1,2-polymerization in this invention, there may be employed, for example, the solution containing a high cis-1,4-polymerization catalyst and a high cis-1,4-polybutadiene obtained in the high cis-1,4-polymerization step, a solution containing a polymerization terminator, such as an alcohol, an organic carboxylic acid, or the like, and an amine- or phenol-type antioxidant, or a solution prepared by solidifying and drying the high cis-1,4-polybutadiene and then dissolving it in a hydrocarbon solvent or a halogenated hydrocarbon solvent.

The 1,2-polymerization in this invention is a polymerization of 1,3-butadiene with a 1,2-polymerization catalyst in said high cis-1,4-polybutadiene solution.

The cobalt compound used as the component (A) of the 1,2-polymerization catalyst in this invention may be selected from cobalt organocarboxylates, cobalt organosulfonates, β-diketone complex compounds of cobalt, tertiary amine complex compounds of cobalt halide, phosphine complex compounds of cobalt halide and the like. Examples of such compounds are cobalt naphthenate, cobalt octanoate, cobalt stearate, cobalt acetate, cobalt benzoate, cobalt salicylate, cobalt dodecylbenzenesulfonate, bis(ethyl acetoacetate)cobalt, tris(acetylacetonato)cobalt, dichlorobis(pyridine)cobalt, dichlorobis(triphenylphosphine)cobalt, dibromobis(triphenylphosphine)cobalt, dibromobis(triethylphosphine)cobalt and the like.

In the compound (B), as the trialkylaluminum (i), there may be used, for example, trimethylaluminum, triethylaluminum, triisobutylaluminum, trihexylaluminum or the like. The reaction product of a trialkylaluminum and an alcohol (ii) contains an alkylaluminum alkoxide as main product and is preferably obtained by reacting one mole of a trialkylaluminum with 0.2 to 0.9 hydroxy equivalent of an alcohol. As the trialkylaluminum, the compounds mentioned above as examples of the component (i) may be used. As the alcohol used for said reaction, there may be used, for example, ethyl alcohol, methyl alcohol, propyl alcohol, butyl alcohol, 2-ethylhexyl alcohol, decyl alcohol, lauryl alcohol, cyclohexyl alcohol, benzyl alcohol, furfuryl alcohol or cinnamyl alcohol. The reaction product of a trialkylaluminum and water (ii) is preferably obtained by reacting one mole of a trialkylaluminum with not more than 1.5 moles of water. For the mixture of a trialkylaluminum and a dialkylaluminum halide (iii), it is desirable that the dialkylaluminum halide be mixed in a proportion of 10–90 mole percent. As said dialkylaluminum halide, there may be used, for example, diethylaluminum chloride, dibutylaluminum chloride, etc. As the trialkylaluminum, the compounds mentioned above as examples of the component (i) may be used. As the dialkylaluminum hydride (iv), there may be used, for example, diisobutylaluminum hydride, diethylaluminum hydride and the like. As the organolithium compound (v), there may be used, for example, ethyllithium, propyllithium, butyllithium, dilithiobutane, and the like.

The sulfur-containing compound used as the component (C) is selected from phenyl isothiocyanate and carbon disulfide.

The amount of the 1,2-polymerization catalyst used in the process of this invention is that corresponding to 0.01 to 2 mg atom cobalt of the component (A) per 100 g of 1,3-butadiene. The ratios of the respective components of the 1,2-polymerization catalyst used in this invention are as specified below:

Component (B)/component (A) (molar ratio)=1/1 to 100/1

Component (C)/componene (A) (molar ratio)=0.005/1 to 100/1

The order of addition of the respective catalyst components for the 1,2-polymerization and the method of the preparation of the catalyst are not critical though it is usual to add the component (A), the component (B) and the component (C) in this order, or the component (B), the component (A) and the component (C) in this order to a high cis-1,4-polybutadiene solution containing 1,3-butadiene, or to add the reaction product obtained by reacting the component (A) and the component (B) in the presence of a small quantity of 1,3-butadiene to a high cis-1,4-polybutadiene solution containing 1,3-butadiene and then add thereto the component (C).

The solvent used for the 1,2-polymerization, that is, the solvent used in the high cis-1,4-polybutadiene solution, is selected from the hydrocarbon solvents or halogenated hydrocarbon solvents such as methylene chloride, ethylene dichloride, chlorobenzene, and the like. The temperature employed for said 1,2-polymerization is $-20°$ to $+80°$ C., preferably 0° to 50° C.

The polybutadiene produced by the 1,2-polymerization according to this invention is a syndiotactic 1,2-polybutadiene having a melting point of 180° to 220° C., but in case of using a dialkylaluminum halide as the catalyst component (B), there can be obtained, beside said syndiotactic 1,2-polybutadiene, a polymer containing amorphous 1,2-polybutadiene and a high cis-1,4-polybutadiene.

In practicing the process of this invention, both 1,3-butadene and solvent may be added in their entire amounts at the stage of high cis-1,4-polymerization, or a part of the 1,3-butadiene and/or the solvent may be added at the stage of high cis-1,4-polymerization, followed by adding the remaining 1,3-butadiene and/or solvent at the stage of 1,2-polymerization. The 1,3-butadiene concentration in the high cis-1,4-polymerization and 1,2-polymerization reaction systems may be in a wide range of from 2 to 50% by weight. The polybutadiene produced by 1,2-polymerization in a high cis-1,4-polybutadiene solution can be collected by adding a terminator and an antioxidant to the polymerization system and then adding a precipitating agent such as methyl alcohol, isopropyl alcohol, acetone, or the like, or blowing steam into the system to evaporate away the polymerization solvent and precipitate the polymer, and separating and drying the polymer.

The polybutadiene obtained by the process of this invention has a 1,2-configuration content of 5 to 40%, preferably 7 to 25%, and a Mooney viscosity $(ML_{1+4}^{100°\ C.})$ of 20 to 150, preferably 25 to 100. Also, the 1,2-configuration portion in the polybutadiene has a melting point of 180° to 220° C.

Owing to 1,2-polymerization in a high cis-1,4-polybutadiene solution, the polybutadiene obtained according to the process of this invention cannot be definitely separated into high cis-1,4-polybutadiene and syndiotactic 1,2-polybutadiene by fractional precipitation.

Also, the polybutadiene obtained by the process of this invention is a composite compound in which syndiotactic 1,2-polybutadiene is dispersed in the high cis-1,4-polybutadiene matrix, and hence, by using as said matrix a high cis-1,4-polybutadiene prepared by using a nickel type catalyst, it is made possible to produce rubber goods having a higher tear strength and better flexural fatigue properties and processability than those obtained from other types of polybutadiene when compared at substantially the same level of modulus and hardness.

The polybutadiene of this invention can be used as an oil-extened rubber when blended with an aromatic, naphthenic or paraffinic oil.

It is also possible to obtain rubber products for tire and other various industrial rubber products from the polybutadiene of this invention by kneading it with compounding agents such as a curing agent, a curing accelerator, a reinforcing agent, a filler, an antioxidant, a processing oil, etc., and molding and vulcanizing the mixture.

The polybutadiene of this invention may also be used in admixture with natural rubber or synthetic rubber such as styrene-butadiene rubber, butadiene rubber, isoprene rubber, nitrile rubber, chloroprene rubber, ethylene-propylene rubber, 1,2-polybutadiene, and the like.

In the Examples, Comparative Examples and Referential Example which appear hereinafter, the microstructure of the polybutadiene was determined by the infrared spectrum method [Tanaka et al.: J. Polymer Sci., Vol. 9, 43 (1971)]. The melting point is the peak temperature on the endothermic curve determined by a differential scanning calorimeter (DSC). The properties of the cured products were determined according to JIS K-6301. The flexural crack propagation was shown by the crack length expressed by an index figure based on the crack length of 2 mm when the product was subjected to 10,000 repetitions of flexing by a de Mattia machine (300 repetitions/min). Elongational fatigue was expressed by the number of repetitions of flexing (expressed by an index) at which the product was broken down by using a de Mattia machine and JIS #3 dumbbells, with such a stroke that the maximum elongation would be 125%.

This invention is explained in further detail below referring to Examples, Comparative Examples and Referential Example. In the Examples, Comparative Examples and Referential Example, all "parts" and "%" are by weight unless otherwise specified.

EXAMPLE 1

In a 5-liter reactor equipped with a stirrer were placed 2.5 kg of toluene and 500 g of 1,3-butadiene under a nitrogen atmosphere, followed by further placing therein a catalyst which had been previously prepared by mixing 0.32 mg atom Ni of nickel naphthenate, 2.86 mmols of boron trifluoride-diethyl etherate and 2.07 mmols of triethylaluminum in the presence of 0.7 mmol of 1,3-butadiene and ageing the mixture at 20° C. for 30 minutes, and the whole mixture was subjected to high cis-1,4-polymerization at 50° C. for 3 hours. Thereafter, 1 g of rosin acid was added to terminate the polymerization.

The polymerization conversion in this high cis-1,4-polymerization was 95%, and the intrinsic viscosity $[\eta]_{toluene}^{30°\ C.}$ of the produced high cis-1,4-polybutadiene was 2.0 dl/g.

After said high cis-1,4-polymerization, 150 g of 1,3-butadiene was added to the high cis-1,4-polybutadiene solution, followed by further addition of 0.15 mmol of cobalt octanoate, 5 mmols of triethylaluminum, 2.5 mmols of diethylaluminum chloride and 1.5 mmols of carbon disulfide, and the resulting mixture was subjected to 1,2-polymerization at 25° C. for 1 hour.

The resulting polymer solution was added to methanol containing 1% of 2,6-di-tert-butyl-p-cresol and the precipitated polymer was separated and dried in vacuo to obtain 535 g of polybutadiene. Characteristic properties of the thus obtained polybutadiene are shown in Table 1.

This polybutadiene was kneaded with natural rubber, carbon black, zinc white, stearic acid, etc. with the following recipe by a Banbury mixer, followed by further compounding a curing agent and a curing accelerator by rolls, and the resulting compound was cured at 145° C. for 40 minutes:

| Compounding recipe | |
|---|---|
| Natural rubber (RSS #3) | 50 parts |
| Polybutadiene | 50 parts |
| Carbon (ISAF) | 50 parts |
| Aromatic oil | 10 parts |
| Zinc white | 4 parts |
| Stearic acid | 2 parts |
| Accelerator MSA*[1] | 0.6 part |
| Accelerator DM*[2] | 0.15 part |
| Sulfur | 2.0 parts |

*[1]N-oxydiethylene-2-benzothiazole-sulfenamide
*[2]di-2-benzothiazylsulfide

Physical properties of vulcanizates are shown in Table 2.

TABLE 1

| | Mooney viscosity $ML_{1+4}^{100°\ C.}$ | Micro-structure (%) | | | Melting point of 1,2-configuration portion (°C.) |
|---|---|---|---|---|---|
| | | 1,2 | cis-1,4 | trans-1,4 | |
| Polybutadiene used in Example 1 | 42 | 12.8 | 85.8 | 1.4 | 204 |
| Polybutadiene used in Comparative Example 1 | 42 | 12.5 | 86.3 | 1.2 | 204 |
| Polybutadiene used in Comparative Examples 2 and 3 | 43 | 2.3 | 94.8 | 2.9 | — |
| Polybutadiene used in Comparative Example 4 | 41 | 12.9 | 85.7 | 1.4 | 204 |
| Polybutadiene used in Comparative Example 5 | 42 | 13.2 | 83.1 | 3.7 | 204 |

TABLE 2

|  | Example 1 | Compar. Example 1 | Compar. Example 2 | Compar. Example 3 | Compar. Example 4 | Compar. Example 5 |
| --- | --- | --- | --- | --- | --- | --- |
| Mooney viscosity of the compound (ML$_{1+4}^{100°\ C.}$) | 50 | 57 | 45 | 70 | 60 | 58 |
| 300% modulus (kg · f/cm$^2$) | 134 | 134 | 105 | 133 | 135 | 130 |
| Tensile strength (kg · f/cm$^2$) | 265 | 260 | 270 | 250 | 260 | 258 |
| Elongation (%) | 580 | 550 | 600 | 540 | 530 | 570 |
| Hardness (JIS-A) | 69 | 68 | 63 | 69 | 68 | 67 |
| Tear strength (kg · f/cm) | 96 | 90 | 86 | 70 | 87 | 89 |
| Flexural crack propagation (index)* | 55 | 80 | 100 | 200 | 95 | 85 |
| Elongational fatigue (125%) number of repetitions of flexing (index)** | 220 | 130 | 100 | 60 | 110 | 135 |

Note:
*The value obtained in Comparative Example 2 was indicated as 100. (The smaller the index, the higher the resistance to flexural crack propagation).
**The value obtained in Comparative Example 2 was indicated as 100. (The greater the index, the better the elongation fatigue).

The polybutadienes used in the Comparative Examples had the micro-structures and Mooney viscosities shown in Table 1.

The polybutadiene used in Comparative Example 1 was prepared according to the method of Example 1 of Japanese Patent Publication No. 17666/74. It was compounded and vulcanized in the same manner as in Example 1.

The polybutadiene used in Comparative Example 2 was a high cis-1,4-polybutadiene prepared in the same manner as in Example 1, except that the amount of boron trifluoride-diethyl etherate in the high cis-1,4-polymerization was varied to 2.40 mmols to adjust the Mooney viscosity to 43. It was compounded and vulcanized in the same way as in Example 1.

The polybutadiene used in Comparative Example 3 was the same as in Comparative Example 2, and compounded and vulcanized in the same way as in Example 1, except that carbon black was used in an amount of 60 parts in the compounding recipe in Example 1.

The polybutadiene used in Comparative Example 4 was prepared by dry-blending the high cis-1,4-polybutadiene obtained by the high cis-1,4-polymerization of Example 1 with the 1,2-polybutadiene obtained by polymerizing 1,3-butadiene in a toluene solvent by using the 1,2-polymerization catalyst of Example 1. Said polybutadiene was compounded and vulcanized in the same manner as in Example 1.

The polybutadiene used in Comparative Example 5 was prepared in the following way:

In a 5-liter reactor equipped with a stirrer were placed 2.4 kg of toluene and 400 g of 1,3-butadiene under a nitrogen atmosphere, followed by further addition of 0.312 g of titanium tetrachloride, 1.052 g of iodine and 1.224 g of triethylaluminum, and the mixture was subjected to polymerization at 10° C. for 3 hours. The polymerization conversion was 100%, and the intrinsic viscosity $[\eta]_{toluene}^{30°\ C.}$ of the resulting cis-1,4-polybutadiene was 1.8 dl/g.

To the cis-1,4-polybutadiene solution was added 100 g of 1,3-butadiene, followed by further addition of 0.15 mmol of cobalt octanoate, 5 mmols of triethylaluminum, 2.5 mmols of diethylaluminum chloride and 1.5 mmols of carbon disulfide, and the mixture was subjected to polymerization at 25° C. for 30 minutes.

The resulting polymer solution was added to methanol containing 1% of 2,6-di-tert-butyl-p-cresol and the precipitated polymer was separated and dried under reduced pressure to obtain 435 g of polybutadiene. This polybutadiene was compounded and vulcanized in the same manner as in Example 1.

As seen from Table 2, the polybutadiene according to this invention is superior to the other polybutadienes in tear strength and flexural fatigue properties when compared at substantially the same level of modulus and hardness.

EXAMPLE 2

High cis-1,4-polymerization was carried out in the same way as in Example 1, except that nickel octanoate was used as the nickel compound and triisobutylaluminum as the organoaluminum compound, immediately after which 150 g of 1,3-butadiene was added without adding a polymerization terminator, and 1,2-polymerization was effected by using the 1,2-polymerization catalyst shown in Table 3.

The polymerization yield and the microstructure, Mooney viscosity and melting point of the resulting polybutadiene are shown in Table 3. The polybutadiene was compounded and vulcanized in the same manner as in Example 1. Physical properties of the vulcanizate are shown in Table 4.

EXAMPLES 3 AND 4

The high cis-1,4-polymerization was carried out according to Example 1, and this was followed by the 1,2-polymerization in the same way as in Example 1, except that the compounds for catalyst shown in Table 3 were used.

The polymer yield and the micro-structure, Mooney viscosity and melting point of the 1,2-configuration portion of the obtained polybutadiene were as shown in Table 3. The polybutadienes obtained in the respective Examples were compounded and vulcanized in the same manner as in Example 1. Physical properties of the vulcanizates are shown in Table 4.

TABLE 3

| Example No. | Cobalt compound (mM) | Organoaluminum compound | Sulfur compound (mM) | High cis-1,4-polymerization conversion (%) | 1,2-polymerization conversion (%) | Mooney viscosity ML$_{1+4}^{100°\ C.}$ | Melting point of 1,2-configuration portion (°C.) | Micro-structure (%) | | |
| --- | --- | --- | --- | --- | --- | --- | --- | --- | --- | --- |
| | | | | | | | | 1,2 | Cis-1,4 | Trans-1,4 |
| 2 | Cobalt naphthenate | Reaction product of triisobutyl- | Carbon disulfide | | | | | | | |

TABLE 3-continued

| Example No. | Cobalt compound (mM) | Organoaluminum compound (mM) | Sulfur compound (mM) | High cis-1,4-polymerization conversion (%) | 1,2-polymerization conversion (%) | Mooney viscosity $ML_{1+4}^{100°\,C.}$ | Melting point of 1,2-configuration portion (°C.) | Micro-structure (%) 1,2 | Cis-1,4 | Trans-1,4 |
|---|---|---|---|---|---|---|---|---|---|---|
| | (0.30) | aluminum (15) and water (4) | (3.0) | 95 | 36 | 48 | 204 | 13.2 | 84.0 | 2.8 |
| 3 | Tris(acetylacetonato)-cobalt (0.30) | Mixture of triethylaluminum (7.5) and diethylaluminum chloride (7.5) | Phenylisothiocyanate (3.0) | 94 | 42 | 53 | 204 | 15.1 | 83.3 | 1.6 |
| 4 | Cobalt octanoate (0.24) | Reaction product of triisobutylaluminum (2.40) and 2-ethylhexanol (1.20) | Carbon disulfide (2.4) | 94 | 22 | 38 | 201 | 9.5 | 87.7 | 2.8 |

TABLE 4

| | Example 2 | Example 3 | Example 4 |
|---|---|---|---|
| 300% Modulus (kg · f/cm²) | 137 | 140 | 130 |
| Tensile strength (kg · f/cm²) | 266 | 260 | 265 |
| Elongation (%) | 580 | 550 | 582 |
| Hardness (JIS-A) | 70 | 71 | 68 |
| Tear strength (B type) (kg · f/cm) | 96 | 95 | 94 |
| Flexural crack progation index* | 190 | 170 | 170 |
| Elongational fatigue 125%** (number of repetitions of flexing) | 225 | 230 | 210 |

Note:
*The value of Comparative Example 2 is indicated as 100, and the values of Examples 2 to 4 are compared therewith.
**The value of Comparative Example 2 is indicated as 100, and the values of Examples 2 to 4 are compared therewith.

EXAMPLE 5

The high cis-1,4-polymerization procedure of Example 1 was repeated, except that bis(acetylacetonato)-nickel was substituted for the nickel naphthenate, boron trifluoride-dibutyl ether for the boron trifluoridediethyl ether and a toluene/haptane (60/40) mixture for the toluene, to obtain a high cis-1,4-polybutadiene with a polymerization conversion of 97%. The polymer solution obtained was added to methanol containing 1% of 2,6-di-tert-butyl-p-cresol and the precipitated polymer was separated and dried in vacuo to obtain 484 g of a high cis-1,4-polybutadiene with a Mooney viscosity $(ML_{1+4}^{100°\,C.})$ of 30, a cis-1,4 content of 94.9%, a 1,2 content of 2.5% and a trans-1,4 content of 2.6%. 300 g of this polymer was dissolved in 2 kg of methylene chloride in a 5-liter reactor equipped with a stirrer under a nitrogen atmosphere, after which 50 g of 1,3-butadiene, 3 mmols of triethylaluminum, 0.15 mmol of cobalt octanoate and 0.75 mmol of carbon disulfide were added thereto. The resulting mixture was subjected to 1,2-polymerization at 25° C. for 30 minutes. The polymer solution obtained was added to methanol containing 1% of di-tert-butyl-p-cresol and the precipitated polymer was separated and dried to obtain a polybutadiene with a Mooney viscosity $(ML_{1+4}^{100°\,C.})$ of 54, a melting point of the 1,2-configuration portion of 203° C., a 1,2 content of 12.5%, a cis-1,4 content of 86.1% and a trans-1,4 content of 1.4%. This polybutadiene was then compounded and vulcanized in the same manner as in Example 1. The vulcanizate obtained had the following properties: hardness: 71; 300% modulus: 139 kg·f/cm²; tear strength: 93 kg·f/cm; elongational fatigue (125%) index: 220.

REFERENTIAL EXAMPLE

The polybutadienes of Example 1 and Comparative Example 4 were each separated into the precipitate portion and the dissolved portion by fractional precipitation and their micro-structures were examined.

Fractional precipitation

In 200 g of cyclohexane was dissolved 4 g of the polybutadiene sample and the solution was stirred at 50° C. for 180 minutes, after which the slurry obtained was centrifuged at 10,000 r.p.m. at room temperature for 30 minutes to separate the slurry into the soluble portion and the insoluble portion. The insoluble portion was dissolved in 100 g of cyclohexane and again centrifuged, this operation being repeated twice.

The cyclohexane soluble portion was concentrated and then added to methanol and the precipitated polybutadiene was dried. The cyclohexane-insoluble portion was dried as it was to obtain a polybutadiene.

It will be appreciated from Table 5 that the polybutadiene of Comparative Example 4 can be separated into high cis-1,4-polybutadiene and 1,2-polybutadiene, but the polybutadiene of Example 1 is of the type that the polybutadiene cannot be easily separated into high cis-1,4-polybutadiene and 1,2-polybutadiene because the 1,2-configuration content of the cyclohexane-insoluble portion is obviously lower than that of the 1,2-polybutadiene homopolymer of this invention.

TABLE 5

| | Micro-structure of polybutadiene of Example 1 (%) | | | Micro-structure of polybutadiene of Comparative Example 4* (%) | | |
|---|---|---|---|---|---|---|
| | 1,2 | cis-1,4 | trans-1,4 | 1,2 | cis-1,4 | trans-1,4 |
| Cyclohexane-soluble portion | 5.3 | 92.5 | 2.2 | 2.3 | 94.8 | 2.9 |
| Cyclohexane-insoluble portion | 54.5 | 44.1 | 1.4 | 95.0 | 3.2 | 1.8 |

Note:
*A blend of 1,2-polybutadiene (1,2: 95.0%; cis-1,4: 3.1%; trans-1,4: 1.9%) and high cis-1,4-polybutadiene (1,2: 2.3%; cis-1,4: 94.8%; trans-1,4: 2.9%).

What is claimed is:
1. A process for preparing a polybutadiene with a 1,2-configuration content of 5-40%, a Mooney viscosity of 20 to 150 and a melting point 1,2-configuration portion of 180° C. to 220° C., and a cis-1,4-configuration content of at least 60%, which comprises polymerizing 1,3-butadiene in the presence of a 1,2 syndiotactic polymerization catalyst consisting of:
(A) a cobalt compound,
(B) at least one member selected from the group consisting of:
  (i) a trialkylaluminum,
  (ii) a reaction product of a trialkylaluminum and an alcohol or water,
  (iii) a mixture of a trialkylaluminum and a dialkylaluminum halide,
  (iv) a dialkylaluminum hydride, and
  (v) an organolithium compound, and
(C) at least one compound selected from the group consisting of phenyl isothiocyanate and carbon disulfide in a hydrocarbon or halogenated hydrocarbon solution of a high cis-1,4-polybutadiene obtained by polymerizing 1,3-butadiene with a catalyst consisting of:
(D) at least one compound selected from the group consisting of organocarboxylates of nickel and organic complex compounds of nickel,
(E) at least one compound selected from the group consisting of boron trifluoride, boron trifluoride complex compounds and hydrogen fluoride, and
(F) at least one compound selected from the group consisting of the organometallic compounds of the alkali metals and the Group II or III metals of the Periodic Table, wherein the amount of the high cis-1,4-polymerization catalyst used is that corresponding to 0.02-2.5 mg atom nickel of the component (D) per 100 g of 1,3-butadiene.

2. The process according to claim 1, wherein the component (D)/component (F) molar ratio is 0.02/1 to 2/1, and the component (E)/component (F) molar ratio is 0.2/1 to 15/1.

3. The process according to claim 2, wherein the high cis-1,4-polybutadiene has a cis-1,4 content of 90% or more and a 1,2 content of 3% or less and an intrinsic viscosity of 1.2–10 dl/g as measured in toluene at 30° C.

4. The process according to claim 3, wherein the hydrocarbon solution of high cis-1,4-polybutadiene is a solution in an aromatic hydrocarbon or a solution in a solvent containing an aromatic hydrocarbon.

5. The process according to claim 4, wherein the aromatic hydrocarbon is benzene, toluene or xylene.

6. The process according to claim 5, wherein the component (A) of the 1,2-polymerization catalyst is a cobalt organocarboxylate, a cobalt organosulfonate, a β-diketone complex compound of cobalt, a tertiary amine complex compound of a cobalt halide or a phosphine complex compound of a cobalt halide.

7. The process according to claim 5, wherein the component (A) of the 1,2-polymerization catalyst is cobalt naphthenate, cobalt octanoate, cobalt stearate, cobalt acetate, cobalt benzoate, cobalt salicylate, cobalt dodecylbenzenesulfonate, bis(ethyl acetoacetate)cobalt, bis(acetylacetonato)cobalt, tris(acetylacetonato)cobalt, dichlorobis(pyridine)cobalt, dichlorobis(triphenylphosphine)cobalt, dibromobis(triphenylphosphine)cobalt or dibromobis(triethylphosphine)cobalt.

8. The process according to claim 7, wherein the component (B) is trimethylaluminum, triethylaluminum, triisobutylaluminum or trihexylaluminum.

9. The process according to claim 7, wherein the component (B) is a product obtained by reacting 1 mole of a trialkylaluminum selected from the group consisting of trimethylaluminum, triethylaluminum, isobutylaluminum and trihexylaluminum with 0.2–0.9 hydroxy equivalent of methyl alcohol, ethyl alcohol, propyl alcohol, butyl alcohol, 2-ethylhexyl alcohol, decyl alcohol, lauryl alcohol, cyclohexyl alcohol, benzyl alcohol, furfuryl alcohol or cinnamyl alcohol, or a reaction product of 1 mole of said trialkylaluminum and less than 1.5 mole of water.

10. The process according to claim 7, wherein the component (B) is a mixture of 10–90 mol% of a trialkylaluminum selected from the group consisting of trimethylaluminum, triethylaluminum, triisobutylaluminum and trihexylaluminum and 10–90 mol% of diethylaluminum chloride or dibutylaluminum chloride.

11. The process according to claim 7, wherein the component (B) is diethylaluminum hydride or diisobutylaluminum hydride.

12. The process according to claim 7, wherein the component (B) is ethyllithium, propyllithium, butyllithium or dilithiobutane.

13. The process according to claim 8, 9, 10, 11 or 12, wherein the component (B)/component (A) molar ratio is 1/1 to 100/1 and the component (C)/component (A) molar ratio is 0.005/1 to 100/1.

14. The process according to claim 13, wherein the 1,2-polymerization of 1,3-butadiene is effected at a temperature of −20° to +80° C.

15. The process according to claim 14, wherein the 1,2-polymerization of 1,3-butadiene is effected at a temperature of 0° to 50° C.

16. The process according to claim 15, wherein the concentration of 1,3-butadiene in the polymerization system is 2–50% weight.

17. The process according to claim 16, wherein the whole amounts of 1,3-butadiene and solvent are added at the stage of high cis-1,4-polymerization.

18. The process according to claim 16, wherein a part of the 1,3-butadiene and/or solvent is added for high cis-1,4-polymerization and the remaining 1,3-butadiene and/or solvent is added for 1,2-polymerization.

* * * * *